June 19, 1951  J. A. DOREMUS  2,557,864
OBJECT-LOCATING RADIO SYSTEM
Filed Dec. 5, 1945
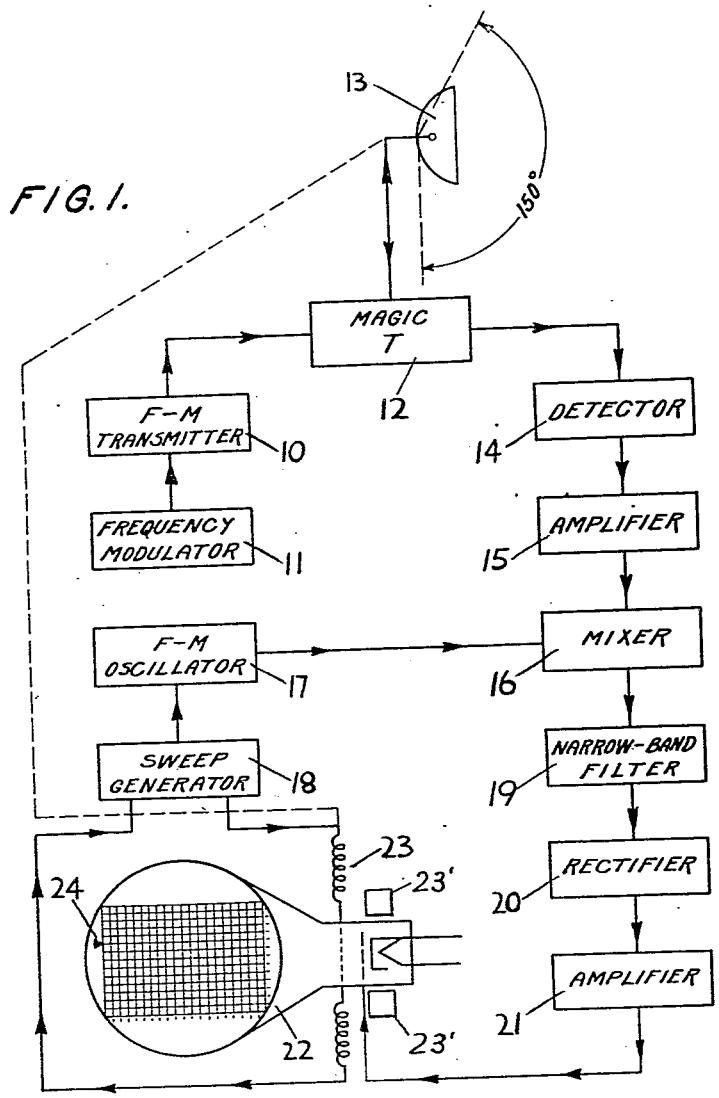
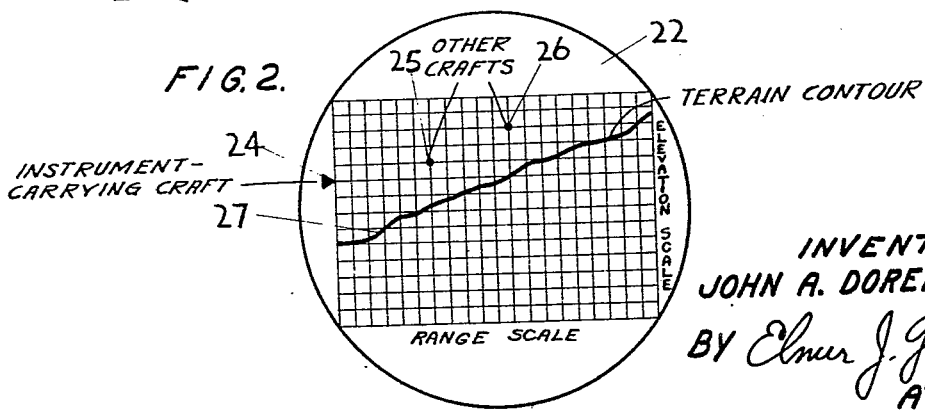
INVENTOR
JOHN A. DOREMUS
BY Elmer J. Gorn
ATTY.

Patented June 19, 1951

2,557,864

UNITED STATES PATENT OFFICE 2,557,864

OBJECT-LOCATING RADIO SYSTEM

John A. Doremus, Lincoln, Mass., assignor to Raytheon Manufacturing Company, Newton, Mass., a corporation of Delaware Application December 5, 1945, Serial No. 632,921

14 Claims. (Cl. 343—14)

This invention relates to object-locating radio systems, and more particularly to systems of the general character indicated which are of the frequency-modulated type.

While not limited thereto, the present invention is intended for use, primarily, as an airborne obstruction and terrain indicator, although, as will become apparent as the description thereof progresses, it constitutes a navigational instrument useful, additionally, in determining altitude, ground speed, and glide path for instrument landing.

The core of the present invention is, essentially, a frequency meter, and, as a matter of fact, it may used as such. However, when appropriately calibrated, and included as a component of a general system such as that above referred to, whether airborne or not, it interprets the instantaneous frequency of a beat signal, derived by heterodyning a signal reflected from an object in space with an instantaneously transmitted signal, directly in terms of the distance to the object causing the reflected signal.

Frequency-modulated, object-locating radio systems ordinarily comprise a c-w transmitter which is adapted to have its frequency recurrently swept, at a relatively low, audio-frequency rate, through a selected radio-frequency band. The resulting r-f signal is directionally radiated into space, and upon such signal encountering an obstruction, such as the earth, aircraft, surface vessels, or the like, a portion of the energy thereof is reflected. The reflected signal, known as an echo, is received back at the site of the original transmission, where it is mixed with the signal instantaneously being transmitted to produce a beat signal whose frequency, as will be readily understood by those skilled in the art to which the present invention relates, is a function of the distance to the reflecting object.

Such a beat signal is usually applied to suitable frequency-responsive apparatus, such as a cycle-counting circuit, and the output of said cycle-counting circuit is usually applied to an appropriately calibrated meter to indicate the frequency of said beat signal directly in terms of distance.

The indicating end of such a system produces no readily observable information concerning the nature of the terrain surrounding the installation; nor does it permit its easy use to determine ground speed, or enable the selection of a glide path. These shortcomings are due to the failure of the system to give the operator the information gleaned thereby in the form of a picture, which may be quickly and easily interpreted.

It is, therefore, one of the objects of the present invention to provide an object-locating radio system which incorporates simple indicating apparatus adapted accurately to display a profile view of the surrounding terrain.

It is another object of the present invention to combine with the aforesaid profile view suitable scales for instantaneously conveying to the observer such information as range, altitude and elevation.

It is still another object of the present invention to so display the foregoing pictorial representation and associated distance parameters as to enable the use thereof for determining the ground speed of an aircraft carrying the equipment.

It is a further object of the present invention to enable the use thereof by an aircraft pilot to choose a glide path at his own discretion, thereby permitting him to make any type of blind-landing approach he may desire.

It is a still further object of the present invention to provide a simple and accurate frequency meter.

These and other objects of the present invention, which will become more apparent as the detailed description thereof pregresses, are attained, briefly, in the following manner:

Wherever, throughout this specification, the system as a whole is being considered, it will be assumed that it is airborne. The radio transmitting and receiving equipment of the present invention is similar to that above described in connection with existing frequency-modulated, object-locating systems, for example, radio altimeters, except that the radiating element thereof is adapted to be pivoted through a vertical angle extending from straight down to within, say, 30° of the zenith. The radiation pattern is, preferably, about 20° wide to enable detection of obstructions approximately 10° on either side of the longitudinal axis of the aircraft. Such radiation pattern therefore covers, during its scan, a substantial region of space ahead of, above, and below said aircraft.

The trace of the electron beam of a cathode-ray tube is caused to scan the screen of said tube in synchronism with, and through the same angle as, the vertical scan of the transmitted beam, so that said trace always points along a line corresponding in angle to the angle of the major axis of the radiation pattern of the system. The apex of the scanning angle of the cathode-ray tube corresponds to the position of the aircraft carrying the equipment.

As in existing systems, an echo signal received from any reflecting object is heterodyned with the instantaneously transmitted signal to obtain a beat signal whose instantaneous frequency is a function of distance.

The present system, however, includes a local oscillator which is frequency modulated, at the sweep frequency of the above-mentioned cathode-ray tube, through a band extending, preferably, from a slightly greater frequency than the highest frequency expected from the beat signal, to a frequency of approximately twice that value. The output of this local oscillator is mixed with said beat signal to produce a variable-frequency voltage, the frequency band of which is a function of the instantaneous frequency of the beat signal and includes at least one frequency outside of the band of said beat signal.

The variable-frequency voltage thus produced is applied to a narrow, band-pass filter, ideally, a single-frequency filter, whose center frequency is, preferably, intermediate the highest frequency expected of said beat signal and the lowest frequency of the aforementioned local oscillator. Obviously, the filter will have an output only when the frequency of the variable-frequency voltage resulting from the heterodyning of the beat signal with the local oscillator output is within the pass-band of said filter, and the instant of the occurrence of this filter output will be a function of the distance to the reflecting object causing the beat signal.

The filter output is rectified and applied to the intensity grid of the hereinbefore referred to cathode-ray tube to raise the intensity level of the trace of said tube, which, preferably, is normally below the visibility level, to a point above the visibility level.

As the frequency of the beat signal varies, a profile view of the obstructions causing the same is traced upon the cathode-ray tube screen.

In the accompanying specification there shall be described, and in the annexed drawing shown, an illustrative embodiment of the object-locating radio system of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

In said drawing, Fig. 1 is a block diagram of a frequency-modulated, object-locating radio system assembled in accordance with the principles of the present invention; and Fig. 2 is an enlarged view of the screen of the cathode-ray tube included in said system showing representative terrain and other obstruction indications.

Referring now more in detail to the aforesaid illustrative embodiment of the present invention, with particular reference to the drawing illustrating the same, the numeral 10 designates a conventional radio transmitter adapted to generate ultra-high or hyper-frequency oscillations. For the purposes of this specification, it will be assumed that the natural, unmodulated frequency of said transmitter is 3000 mc./s. The output of a frequency modulator 11, which may take the form of a standard reactance tube circuit, is applied to the transmitter 10 whereby the output thereof is swept, preferably, linearly and bidirectionally, through a band of frequencies extending from its natural, unmodulated frequency of 3000 mc./s. to, say, 3001 mc./s., the resulting triangular frequency modulation recurring at a relatively low, audio-frequency rate, for example, 20 c. p. s.

The output of the transmitter 10 is conveyed to a "Magic T" 12, or any other device capable of so substantially isolating a transmitter from a receiver as to permit the use of a single antenna for simultaneous transmission and reception. From the "Magic T" 12, the transmitter output is conveyed to an appropriate antenna 13 for directionally radiating the same into space. The antenna 13 is adapted to be pivoted so as to cause the radiation pattern thereof to scan a vertical angle, preferably, of about 150°, extending from straight down to about 30° from the zenith. Said radiation pattern is, preferably, about 20° wide in its horizontal dimension, so that obstructions approximately 10° on either side of the longitudinal axis of the aircraft carrying the equipment may be detected.

Assuming that the radiated signal encounters some obstruction, such as the earth, another aircraft, a surface vessel, etc., a portion of the energy thereof will be reflected and subsequently intercepted, back at the site of the original transmission, by the antenna 13.

The reflected signal or echo is conveyed, through the "Magic T" 12, to a detector 14, preferably, a balanced detector, said detector, in addition to being receptive of said echo signal, also being receptive, through said "Magic T," of a small portion of the output of the transmitter 10, whereby the echo signal, which differs in frequency from the instantaneously transmitted signal by a frequency proportional to the distance to the reflecting object, is converted into a beat signal whose instantaneous frequency is, likewise, a function of distance.

The beat signal thus obtained is passed through an amplifier 15, the gain characteristic of which, preferably, increases with frequency so as to compensate for the greater attenuation as the signal distance increases, and the output of said amplifier 15 is applied to a mixer 16.

The mixer 16 is also receptive of the output of a frequency-modulated oscillator 17 which is adapted to be triggered by a portion of the output of a sweep or timing voltage generator 18. The frequency band of the oscillator 17 extends from slightly higher than the highest frequency expected of the beat signal resulting from the heterodyning of the echo and instantaneously transmitted signal to about twice that frequency. For example, if the maximum range of the system is, say, 22.5 miles, corresponding to a "radar" time of 250 microseconds, the highest frequency expected of the beat signal, considering the hereinbefore referred to repetition rate of the transmitter 10, namely 20 c. p. s., will be 10 kc. The frequency band of the oscillator 17 may, therefore, extend from 10.5 kc. to 20.25 kc. In any event, the frequency band of the oscillator 17 should be such that when the output of the oscillator is heterodyned with the beat signal coming from the amplifier 15, the resulting variable-frequency voltage will always include at least one frequency outside of the band of said beat signal.

The variable-frequency voltage from the mixer 16, is applied to a narrow, band-pass filter 19, the center frequency of which corresponds to one of the above-mentioned frequencies outside the band of the beat signal. Preferably, said center frequency is intermediate the highest frequency of said beat signal and the lowest frequency of the oscillator 17, for example, 10.25 kc. Thus, at some time during each frequency sweep of the oscillator 17, the beat signal coming from the amplifier 15 will, together with the output of said oscillator 17, produce a signal having a difference frequency which will pass through the filter 19. The time of the occurrence of the signal of said difference frequency depends, it will be observed, on the instantaneous frequency of the beat signal, in other words, on the distance to the obstruction causing said beat signal.

The filter output is applied to a rectifier 20, an amplifier 21, and then, to the control grid of a cathode-ray tube 22, the electron beam of which is, in the absence of any output from said filter, maintained, by a suitable biasing arrangement, at such intensity that the trace thereof upon the screen of the cathode-ray tube is below the level of visibility.

The output of the sweep or timing-voltage generator 18, preferably, of a frequency of about 1000 c. p. s., is applied to suitable deflecting coils 23 so as to deflect the electron beam of the cathode-ray tube in synchronism with the frequency sweep of the oscillator 17, the sweep of said electron beam always commencing at the same point, preferably, at one side and above the center of the screen of the cathode-ray tube. In order to cause the sweep of the electron beam always to commence at said same point, the cathode-ray tube may be provided with any suitable means, generally designated by the reference character 23', capable of initially deflecting the beam to the desired point. Such means form no part of the present invention, but the following expedients, among others, may be used for the purpose: 1. a cathode-ray tube having a tilted electron gun directed towards the desired spot; 2. a cathode-ray tube having electrostatic deflecting plates to which appropriate biasing potentials are applied; 3. a cathode-ray tube having separate electromagnetic deflecting coils to which appropriate biasing currents are applied; and 4. a cathode-ray tube having external permanent magnets of appropriate relative strengths. Regardless of the means utilized for initially positioning the electron beam, said point corresponds to the position of the aircraft carrying the equipment and may be marked upon the screen by an index 24. The distance between the commencement of the cathode-ray tube sweep and any given spot on the screen is proportional to the distance to the obstruction causing said spot, and the screen may be accordingly calibrated directly in terms of distance.

In order to indicate the relative elevation of any given obstruction with respect to the aircraft, the cathode-ray tube sweep is scanned through an angle corresponding to the scanning angle of the antenna 14 by rotating the deflecting coils 23 in synchronism with the movement of the antenna, the connection between the coils and the antenna being designated in the drawing by the broken line.

Referring now specifically to Fig. 2 of the drawing, two spots 25 and 26 may be seen. The first of these spots is intended to indicate another aircraft which is six distance units in front of and one distance unit above the aircraft carrying the equipment. The second spot is intended to indicate still another aircraft which is eleven distance units in front of and three distance units above the aircraft carrying the equipment. The heavy line 27 is intended to indicate the profile view of the terrain ahead of and below the aircraft carrying the equipment. Obviously, if there is a continuously reflecting surface within the range of the system, the rate of the intermittent output from the filter 19 will be such that the spots will merge into a continuous line.

It will be noted from Fig. 2 of the drawing that the aircraft is, at the moment, at an absolute altitude of four distance units, that the terrain rises to the altitude of the aircraft eleven distance units ahead of the same, and that, as far as the picture appearing on the screen at the moment is concerned, the terrain rises to an elevation three and one-half distance units higher than the present altitude of the aircraft at a distance of twenty distance units in front of said aircraft. Thus, the observer has before him at all times a picture of the obstructions ahead of, above, and below his aircraft.

By observing the time elapsing during the passage of the aircraft between two selected targets, the distance between which is known from a reading of the range scale associated with the screen of the cathode-ray tube, ground speed may be determined.

While the present invention has been described in detail as a component of an object-locating system, it is apparent that any signal of unknown frequency may be fed to the mixer 16, not necessarily one resulting from heterodyning transmitted and reflected signals. Therefore, by suitably calibrating the cathode-ray tube screen in terms of frequency rather than distance, the device becomes a frequency meter, and the component frequencies of such signal may be determined. When used in this manner, it is not necessary to scan the screen of the cathode-ray tube; it is only necessary that the electron beam of such tube be recurrently deflected along a single line.

This completes the description of the present invention. Objects and advantages thereof, other than those specifically referred to in earlier portions of this specification, will readily occur to those skilled in the art to which the same relates.

What is claimed is:

1. In a frequency-modulated, object-locating system wherein transmitted and reflected radio signals are heterodyned to derive a variable-frequency beat signal each component frequency of which is a function of the distance to a reflecting object, means for translating said beat signal into visual indicia of the locations, with respect to the site of the system, of the objects causing the same, comprising: means for cyclically generating a timing voltage; means, synchronized with said timing voltage, for deriving from said beat signal a variable-frequency voltage the frequency band of which is a function of the instantaneous frequency of said beat signal and includes at least one frequency outside of the band of said beat signal; means, receptive of said variable-frequency voltage, for substantially attenuating all of the frequencies in the band thereof except substantially one of those, as aforesaid, outside of the band of said beat signal; means for rectifying the substantially single-frequency voltage not attenuated by said last-named means; and means, receptive of said timing and rectified voltages, for visually indicating, during each cycle of said timing voltage, the instant of occurrence of said rectified voltage.

2. In a frequency-modulated, object-locating system wherein transmitted and reflected radio signals are heterodyned to derive a variable-frequency beat signal each component frequency of which is a function of the distance to a reflecting object, means for translating said beat signal into visual indicia of the locations, with respect to the site of the system, of the objects causing the same, comprising: an oscillator for generating a time-base voltage; means, synchronized with said oscillator, for deriving from said beat signal a variable-frequency voltage the frequency band of which is a function of the instantaneous frequency of said beat signal and includes at least one frequency outside of the band of said beat signal; means, receptive of said variable-frequency voltage, for substantially attenuating all of the frequencies in the band thereof except substantially one of those, as aforesaid, outside of the band of said beat signal; means for rectifying the substantially single-frequency voltage not attenuated by said last-named means; and a cathode-ray tube, receptive of said time-base voltage to recurrently sweep the electron beam thereof, and receptive of said rectified voltage to intensity modulate said electron beam, for indicating, during each cycle of said time-base voltage, the instant of occurrence of said rectified voltage.

3. In a frequency-modulated, object-locating system wherein transmitted and reflected radio signals are heterodyned to derive a variable-frequency beat signal each component frequency of which is a function of the distance to a reflecting object, means for translating said beat signal into visual indicia of the locations, with respect to the site of the system, of the objects causing the same, comprising: means for cyclically generating a timing voltage; means, synchronized with said timing voltage, for deriving from said beat signal a variable-frequency voltage the frequency band of which is a function of the instantaneous frequency of said beat signal and includes at least one frequency outside of the band of said beat signal; said last-named means including an oscillator adapted to be triggered by said first-named means to produce a variable-frequency output entirely outside of the band of said beat signal, and a mixer for heterodyning said beat signal with said variable-frequency output; means, receptive of said variable-frequency voltage, for substantially attenuating all of the frequencies in the band thereof except substantially one of those, as aforesaid, outside of the band of said beat signal; means for rectifying the substantially single-frequency voltage not attenuated by said last-named means; and means, receptive of said timing and rectified voltages, for visually indicating, during each cycle of said timing voltage, the instant of occurrence of said rectified voltage.

4. In a frequency-modulated, object-locating system wherein transmitted and reflected radio signals are heterodyned to derive a variable-frequency beat signal each component frequency of which is a function of the distance to a reflecting object, means for translating said beat signal into visual indicia of the locations, with respect to the site of the system, of the objects causing the same, comprising: an oscillator for generating a time-base voltage; means, synchronized with said oscillator, for deriving from said beat signal a variable-frequency voltage the frequency band of which is a function of the instantaneous frequency of said beat signal and includes at least one frequency outside of the band of said beat signal; said last-named means including an oscillator adapted to be triggered by said first-named oscillator to produce a variable-frequency output entirely outside of the band of said beat signal, and a mixer for heterodyning said beat signal with said variable-frequency output; means, receptive of said variable-frequency voltage for substantially attenuating all of the frequencies in the band thereof except substantially one of those, as aforesaid, outside of the band of said beat signal; means for rectifying the substantially single-frequency voltage not attenuated by said last-named means; and a cathode-ray tube, receptive of said time-base voltage to recurrently sweep the electron beam thereof, and receptive of said rectified voltage to intensity modulate said electron beam, for indicating, during each cycle of said time-base voltage, the instant of occurrence of said rectified voltage.

5. In a frequency-modulated, object-locating system wherein transmitted and reflected radio signals are heterodyned to derive a variable-frequency beat signal each component frequency of which is a function of the distance to a reflecting object, means for translating said beat signal into visual indicia of the locations, with respect to the site of the system, of the objects causing the same, comprising: means for cyclically generating a timing voltage; means synchronized with said timing voltage for deriving from said beat signal a variable-frequency voltage the frequency band of which is a function of the instantaneous frequency of said beat signal and includes at least one frequency outside of the band of said beat signal; said last-named means including an oscillator adapted to be triggered by said first-named means to produce a variable-frequency output entirely outside of the band of said beat signal, and a mixer for heterodyning said beat signal with said variable frequency output; a filter, receptive of said variable-frequency voltage, for substantially attenuating all of the frequencies in the band thereof except substantially one lying intermediate the band of said beat signal and the band of said variable-frequency output; means for rectifying the substantially single-frequency voltage not attenuated by said filter; and means, receptive of said timing and rectified voltages, for visually indicating, during each cycle of said timing voltage, the instant of occurrence of said rectified voltage.

6. In a frequency-modulated, object-locating system wherein transmitted and reflected radio signals are heterodyned to derive a variable-frequency beat signal each component frequency of which is a function of the distance to a reflecting object, means for translating said beat signal into visual indicia of the locations, with respect to the site of the system, of the objects causing the same, comprising: an oscillator for generating a time-base voltage; means, synchronized with said oscillator, for deriving from said beat signal a variable-frequency voltage the frequency band of which is a function of the instantaneous frequency of said beat signal and includes at least one frequency outside of the band of said beat signal; said last-named means including an oscillator adapted to be triggered by said first-named oscillator to produce a variable-frequency output entirely outside of the band of said beat signal, and a mixer for heterodyning said beat signal with said variable-frequency output; a filter, receptive of said variable-frequency voltage, for substantially attenuating all of the frequencies in the band thereof except substantially one lying intermediate the band of said beat signal and the band of said variable-frequency output; means for rectifying the substantially single-frequency voltage not attenuated by said filter; and a cathode-ray tube, receptive of said time-base voltage to recurrently sweep the electron beam thereof, and receptive of said rectified voltage to intensity modulate said electron beam, for indicating, during each cycle of said time-base voltage, the instant of occurrence of said rectified voltage.

7. In a frequency-modulated, object-locating system wherein a selected region of space is scanned by directionally transmitted radio signals, and echo signals, resulting from reflection of said transmitted signals, are heterodyned with said transmitted signals to derive a variable-frequency beat signal each component frequency of which is a function of the distance to a reflecting object, means for translating said beat signal into visual indicia of the locations, with respect to the site of the system, of the objects causing the same, comprising: an oscillator for generating a time-base voltage; means, synchronized with said oscillator, for deriving from said beat signal a variable-frequency voltage the frequency band of which is a function of the instantaneous frequency of said beat signal and includes at least one frequency outside of the band of said beat signal; means, receptive of said variable-frequency voltage, for substantially attenuating all of the frequencies in the band thereof except substantially one of those, as aforesaid, outside of the band of said beat signal; means for rectifying the substantially single-frequency voltage not attenuated by said last-named means; a cathode-ray tube, receptive of said time-base voltage to recurrently sweep the electron beam thereof, and receptive of said rectified voltage to intensity modulate said electron beam, for indicating, during each cycle of said time-base, the instant of occurrence of said rectified voltage; and means, synchronized with the scanning of said selected region of space, for scanning the trace of said electron beam through an angle corresponding to that of said selected region of space.

8. Apparatus for indicating the instantaneous frequency of a variable-frequency voltage, comprising: means for cyclically generating a timing voltage; means, synchronized with said timing voltage, for deriving from said variable-frequency voltage a second variable-frequency voltage the frequency band of which is a function of the instantaneous frequency of said first variable-frequency voltage and includes at least one frequency outside of the band of said first variable-frequency voltage; means, receptive of said second variable-frequency voltage, for substantially attenuating all of the frequencies in the band thereof except substantially one of those, as aforesaid, outside of the band of said first variable-frequency voltage; means for rectifying the substantially single-frequency voltage not attenuated by said last-named means; and means, receptive of said timing and rectified voltages, for indicating, during each cycle of said timing voltage, the instant of occurrence of said rectified voltage.

9. Apparatus for indicating the instantaneous frequency of a variable-frequency voltage, comprising: an oscillator for generating a time-base voltage; means, synchronized with said oscillator, for deriving from said variable frequency voltage a second variable-frequency voltage the frequency band of which is a function of the instantaneous frequency of said first variable-frequency voltage and includes at least one frequency outside of the band of said first variable-frequency voltage; means, receptive of said second variable-frequency voltage, for substantially attenuating all of the frequencies in the band thereof except substantially one of those, as aforesaid, outside of the band of said first variable-frequency voltage; means for rectifying the substantially single-frequency voltage not attenuated by said last-named means; and a cathode-ray tube, receptive of said time-base voltage to recurrently sweep the electron beam thereof, and receptive of said rectified voltage to intensity modulate said electron beam, for indicating, during each cycle of said time-base voltage, the instant of occurrence of said rectified voltage.

10. Apparatus for indicating the instantaneous frequency of a variable-frequency voltage, comprising: means for cyclically generating a timing voltage; means, synchronized with said timing voltage, for deriving from said variable-frequency voltage a second variable-frequency voltage the frequency band of which is a function of the instantaneous frequency of said first variable-frequency voltage and includes at least one frequency outside of the band of said first variable-frequency voltage; said last-named means including an oscillator adapted to be triggered by said first-named means to produce a variable-frequency output entirely outside of the band of said first variable-frequency voltage, and a mixer for heterodyning said first variable-frequency voltage with said variable-frequency output; means, receptive of said second variable-frequency voltage, for substantially attenuating all of the frequencies in the band thereof except substantially one of those, as aforesaid, outside of the band of said first variable-frequency voltage; means for rectifying the substantially single-frequency voltage not attenuated by said last-named means; and means, receptive of said timing and rectified voltages, for indicating, during each cycle of said timing voltage, the instant of occurrence of said rectified voltage.

11. Apparatus for indicating the instantaneous frequency of a variable-frequency voltage, comprising: an oscillator for generating a time-base voltage; means, synchronized with said oscillator, for deriving from said variable-frequency voltage a second variable-frequency voltage the frequency band of which is a function of the instantaneous frequency of said first variable-frequency voltage and includes at least one frequency outside of the band of said first variable-frequency voltage; said last-named means including an oscillator adapted to be triggered by said first-named oscillator to produce a variable-frequency output entirely outside of the band of said first variable-frequency voltage, and a mixer for heterodyning said first variable-frequency voltage with said variable-frequency output; means receptive of said second variable-frequency voltage, for substantially attenuating all of the frequencies in the band thereof except substantially one of those, as aforesaid, outside of the band of said first variable-frequency voltage; means for rectifying the substantially single-frequency voltage not attenuated by said last-named means; and a cathode-ray tube, receptive of said time-base voltage to recurrently sweep the electron beam thereof, and receptive of said rectified voltage to intensity modulate said electron beam, for indicating, during each cycle of said time-base voltage, the instant of occurrence of said rectified voltage.

12. Apparatus for indicating the instantaneous frequency of a variable-frequency voltage, comprising: means for cyclically generating a timing voltage; means, synchronized with said timing voltage, for deriving from said variable-frequency voltage a second variable-frequency voltage the frequency band of which is a function of the instantaneous frequency of said first variable-frequency voltage and includes at least one frequency outside of the band of said first variable-frequency voltage; said last-named means including an oscillator adapted to be triggered by said first-named means to produce a variable-frequency output entirely outside of the band of said first variable-frequency voltage, and a mixer for heterodyning said first variable-frequency voltage with said variable-frequency output; a filter, receptive of said second variable-frequency voltage, for substantially attenuating all of the frequencies in the band thereof except substantially one lying intermediate the band of said first variable-frequency voltage and the band of said variable frequency output; means for rectifying the substantially single-frequency voltage not attenuated by said filter; and means, receptive of said timing and rectified voltages, for indicating, during each cycle of said timing voltage, the instant of occurrence of said rectified voltage.

13. Apparatus for indicating the instantaneous frequency of a variable-frequency voltage, comprising: an oscillator for generating a time-base voltage; means, synchronized with said oscillator, for deriving from said variable-frequency voltage a second variable-frequency voltage the frequency band of which is a function of the instantaneous frequency of said first variable-frequency voltage and includes at least one frequency outside of the band of said first variable-frequency voltage, said last-named means including an oscillator adapted to be triggered by said first-named oscillator to produce a variable-frequency output entirely outside of the band of said first variable-frequency voltage, and a mixer for heterodyning said first variable-frequency voltage with said variable-frequency output; a filter, receptive of said second variable-frequency voltage, for substantially attenuating all of the frequencies in the band thereof except substantially one lying intermediate the band of said first variable-frequency voltage and the band of said variable-frequency output; means for rectifying the substantially single-frequency voltage not attenuated by said filter; and a cathode-ray tube, receptive of said time-base voltage to recurrently sweep the electron beam thereof, and receptive of said rectified voltage to intensity modulate said electron beam, for indicating, during each cycle of said time-base voltage, the instant of occurrence of said rectified voltage.

14. A method for determining the instantaneous frequency of a variable-frequency voltage; which includes the steps of: deriving from said variable-frequency voltage a second variable-frequency voltage the frequency band of which is a function of the instantaneous frequency of said first variable-frequency voltage and includes at least one component frequency outside of the band of said first variable-frequency voltage; filtering said second variable frequency voltage to substantially attenuate all of the frequencies thereof except substantially one of those, as aforesaid, outside of the band of said first variable-frequency voltage; rectifying the remaining, substantially single-frequency voltage; generating a timing voltage; and comparing said rectified and timing voltages to determine, during the cycle of said timing voltage, the instant of occurrence of said rectified voltage.

JOHN A. DOREMUS.

REFERENCES CITED

The following references are of record in the file of this patent:

UNITED STATES PATENTS

| Number | Name | Date |
| --- | --- | --- |
| 2,312,203 | Wallace | Feb. 23, 1943 |
| 2,407,169 | Loughren | Sept. 3, 1946 |
| 2,407,644 | Benioff | Sept. 17, 1946 |
| 2,412,003 | Neufeld | Dec. 3, 1946 |
| 2,423,088 | Earp | July 1, 1947 |
| 2,423,644 | Evans | July 8, 1947 |
| 2,426,189 | Espenschied | Aug. 26, 1947 |
| 2,433,804 | Wolff | Dec. 30, 1947 |
| 2,508,400 | Kiebert | May 23, 1950 |

FOREIGN PATENTS

| Number | Country | Date |
| --- | --- | --- |
| 520,778 | Great Britain | May 3, 1940 |